United States Patent [19]

Yamamoto

[11] Patent Number: 5,369,668
[45] Date of Patent: Nov. 29, 1994

[54] FAST RESPONSE MATCHED FILTER RECEIVER WITH DECISION FEEDBACK EQUALIZER

[75] Inventor: Takeshi Yamamoto, Tokyo, Japan
[73] Assignee: NEC Corporation, Tokyo, Japan
[21] Appl. No.: 952,808
[22] Filed: Sep. 28, 1992
[30] Foreign Application Priority Data
  Sep. 27, 1991 [JP] Japan .................. 3-248192
[51] Int. Cl.$^5$ .................. H03H 7/30; H03H 7/40; H03K 5/159; H03D 1/00
[52] U.S. Cl. .................. 375/14; 375/96
[58] Field of Search .................. 375/14, 96, 11, 12, 375/13, 15, 101, 103

[56] References Cited
U.S. PATENT DOCUMENTS
5,230,006  7/1993  Kurokami ............... 375/14

Primary Examiner—Stephen Chin
Assistant Examiner—Duane Kobayashi
Attorney, Agent, or Firm—Sughrue, Mion, Zinn, Macpeak & Seas

[57] ABSTRACT

A tap-weight controller of a matched filter includes a tapped delay line having a series of delay elements for receiving an incoming digital signal to produce successively delayed signals at successive taps of the delay line so that the signal at the center tap coincides with the output of a decision feedback equalizer (DFE). Correlation circuits are provided corresponding respectively to tap-weight multipliers of a transversal filter and to the taps of the delay line of the tap-weight controller. In each correlation circuit, correlation is detected between the output of the DFE and a signal from the corresponding tap of the delay line, and a signal indicating the detected correlation is integrated over a prescribed interval. An adder has a first input for receiving the detected correlation signal and a second input for receiving the integrated signal or a tap-weight control signal to produce a summed signal. The correlation signal is delayed for an interval equal to the prescribed interval and subtracted from the summed signal to produce an output which is applied to the adder as the tap weight control signal as well as to the corresponding tap-weight multiplier. The integrated signal is initially applied to the second input of the adder, and thereafter; the tap-weight control signal is applied to the adder to update the control signal at symbol intervals.

3 Claims, 2 Drawing Sheets

CROSS-CORRELATION CIRCUIT 27

FAST RESPONSE MATCHED FILTER RECEIVER WITH DECISION FEEDBACK EQUALIZER

BACKGROUND OF THE INVENTION

The present invention relates generally to equalization techniques for digital modulation such as QAM (quadrature amplitude modulation), and more specifically to a matched filter receiver used in combination with a decision feedback equalizer.

In digital radio transmission systems, intersymbol interference can be equalized using a decision feedback equalizer if the ratio of undesired-to-desired signal (p) is smaller than 1. However, if the desired, direct signal arrives at a receiver later than a undesired, reflected version of the transmitted signal, interference occurs between them, causing what is called multipath fading. When this occurs, the amplitude of the undesired signal is stronger than the desired signal, hence p>1, giving rise to a large negative peak at time $t = -T$ (where T is the symbol timing) with respect to the center, positive peak at the origin of the impulse response of the transmission system, whereas, when p=0, i.e., in the absence of the undesired component, the impulse response is symmetrical with respect to the origin. Under such circumstances, intersymbol interference cannot completely be equalized.

It is known that the transfer function of an optimum filter is the complex conjugate of the spectrum of the input signal and such a filter is called a matched filter. Since the impulse response of the matched filter is a timereversed and delayed version of the input signal, the application of a signal whose U/D ratio is smaller than 1 to the matched filter results in the generation of two negative peaks, one at time $t = -T$ and the other at $t = T$, both having amplitudes one-half of the amplitude of the original negative peak at time $t = -T$.

A proposal has been made for using a matched filter in combination with a decision feedback equalizer in order to take advantage of the unique characteristic of the matched filter for equalizing signals affected by multipath fading since the two negative peaks at the output of the matched filter can be easily equalized by the decision feedback equalizer. More specifically, the matched filter is implemented with a transversal filter and a tap-weight controller to control the tap weights of the transversal filter in an adaptive fashion in response to the output of the decision feedback equalizer. The tap-weight controller comprises a plurality of correlation circuits corresponding respectively to the tap-weight multipliers of the transversal filter to detect correlations between delayed incoming signals with the output of the decision feedback equalizer. In each correlation circuit, the detected correlation is integrated over a period $L \times T$ and divided over time L to produce a tap-weight control signal which is an average value of the integrated signal. Since this control signal is updated at $L \times T$ intervals, the prior art matched filter cannot equalize signals affected by multipath fading which varies at rates higher than the rate at which the output of the matched filter is updated.

SUMMARY OF THE INVENTION

It is therefore an object of the present invention to provide a matched filter receiver capable of tracking high speed variations of signals affected by multipath fading.

According to the present invention, the matched filter receiver comprises a transversal filter having a tapped delay line for receiving an incoming digital signal to produce successively delayed signals at successive taps of the delay line, a plurality of tap-weight multipliers connected respectively to the successive taps of the delay line, and means for summing output signals of the tap-weight multipliers to produce a filter output, and supplying the filter output to a decision feedback equalizer. A tap-weight controller includes a second tapped delay line having a series of delay elements for receiving the incoming digital signal to produce successively delayed signals at successive taps of the second delay line so that the delayed signal at a center tap of the second delay line is time coincident with an output signal from the decision feedback equalizer. A plurality of correlation circuits are provided corresponding respectively to the tap-weight multipliers of the transversal filter and the successive taps of the second delay line. Each of the correlation circuits comprises a correlation detector for detecting a correlation between the output signal of the decision feedback equalizer and a signal from the corresponding tap of the second tapped delay line to produce a correlation output signal, an integrator for integrating the correlation output signal over a prescribed interval to produce an integrated signal, and an adder having a first input terminal receiving the correlation output signal, and a second input terminal. Delay means is provided for delaying the correlation output signal for an interval equal to the prescribed interval to produce a delayed signal. A subtractor detects the difference between the delayed signal and an output signal from the adder to produce a difference signal for coupling to the corresponding tap-weight multiplier as a tap-weight control signal. The integrated signal is initially applied to the second input terminal of the adder, and thereafter, the difference signal (tap-weight control signal) is applied to it, instead of the integrated signal. As a result, the tap-weight output signal is summed with a new correlation output signal and the old correlation output signal is then removed from the control signal by subtractor. As the process continues, the tap weight control signal is repeatedly updated at symbol intervals.

BRIEF DESCRIPTION OF THE DRAWINGS

The present invention will be described in further detail with reference to the accompanying drawings, in which.

DETAILED DESCRIPTION

Figure 1:
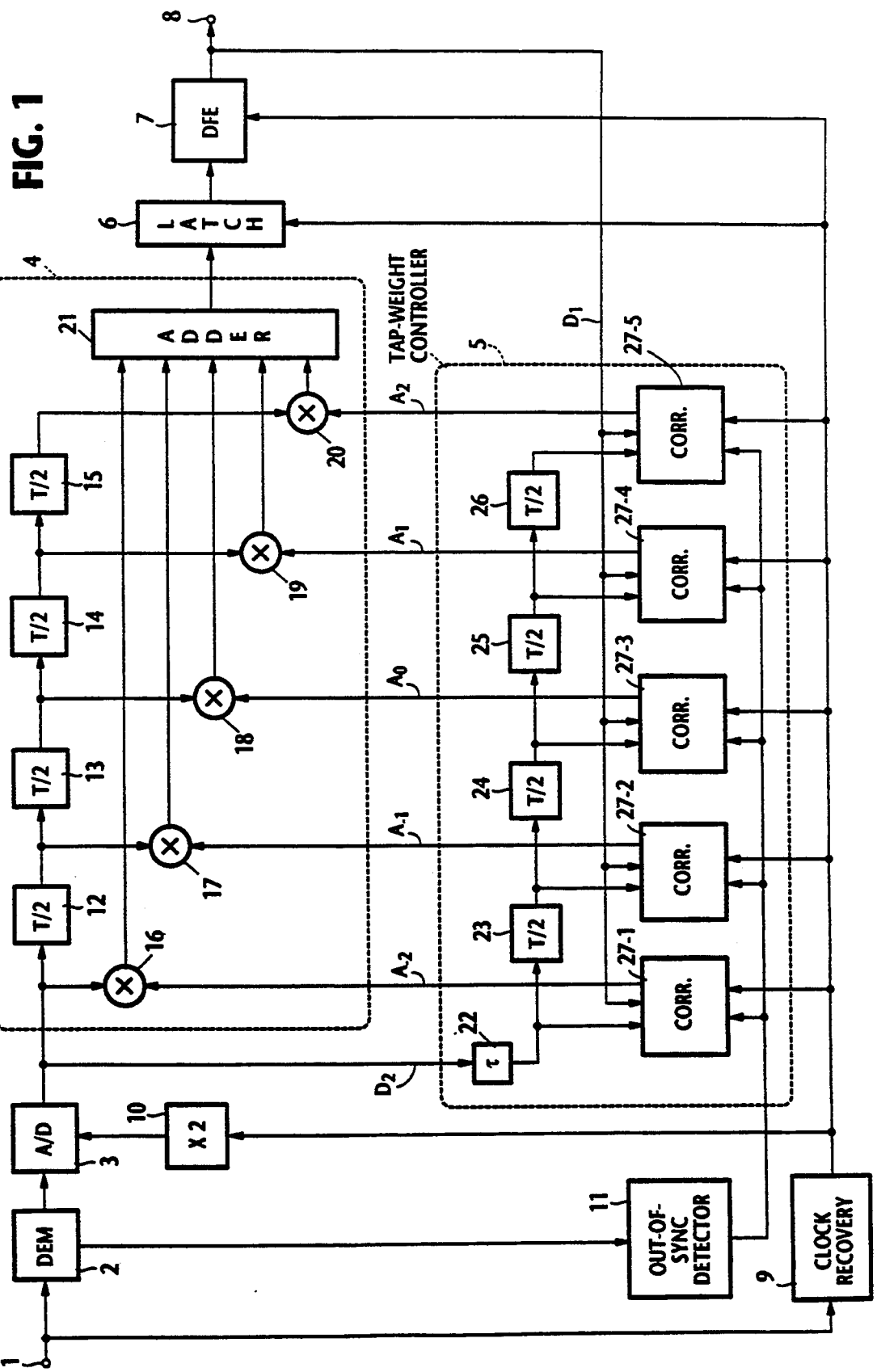
FIG. 1 is a block diagram of a matched filter receiver with a decision feedback equalizer.

Referring to FIG. 1, there is shown a multipath fading equalizer for digitally modulated signals according to the present invention. The IF (intermediate frequency) version of a received signal is applied through an input terminal 1 to a QAM demodulator 2 to produce a baseband signal. The output of the demodulator is converted to a digital signal by an A/D converter 3 and applied to a matched filter comprising a transversal filter 4 whose tap weights are controlled by a tap-weight controller 5 and a latch 6. The output of latch 6 is applied to a decision feedback equalizer 7 to produce an equalized signal at the output terminal 8. A clock recovery circuit 9 is connected to the input terminal to recover a symbol timing clock that is applied to a frequency doubler 10, tap-weight controller 5, latch 6 and decision feedback equalizer 7. The output of frequency doubler 10 is applied as a sampling pulse to the A/D converter 3 to produce a digital signal at a rate twice the symbol timing of the incoming signal. An out-of-sync detector 11 is associated with the demodulator to produce an out-of-sync signal that is applied to tap-weight controller 5 to reset the various components of the controller.

The output of A/D converter 3 is fed into the delay line of transversal filter 4, which typically comprises a series of delay elements 12, 13, 14, and 15, each with a delay time T/2, to form five successive taps which are respectively connected to tap-weight multipliers 16, 17, 18, 19 and 20. These tap-weight multipliers multiply their inputs from the delay line with respective tap-weight coefficients $A_{-2}$, $A_{-1}$, $A_0$, $A_1$ and $A_2$ supplied from tap-weight controller 5 to produce weighted signals. The weighted signals are summed by an adder 21 for coupling to the latch 6 where the summed signal is sampled at the symbol rate and applied to DFE 7.

Tap-weight controller 5 comprises a delay line formed by an adjustment delay element 22 with a delay time $\tau$ and a series of delay elements 23, 24, 25 and 26 each with a delay time T/2 to form successive taps respectively corresponding to those of the delay line of transversal filter 4. This delay line takes its input from the output of A/D converter 3 and its successive taps are connected respectively to correlation circuits 27-1 through 27-5 to which the output of DFE 7 is also applied.

Delay time $\tau$ is determined so that the output of DFE 7 and the output of A/D converter 3, which are respectively indicated at $D_1$ and $D_2$, are made to coincide with each other at the center tap point of the transversal filter 4. Otherwise stated, a delay time $\tau+(T/2)\times 2$ is equal to the total delay of transversal filter 4 and DFE 7.

Figure 2:
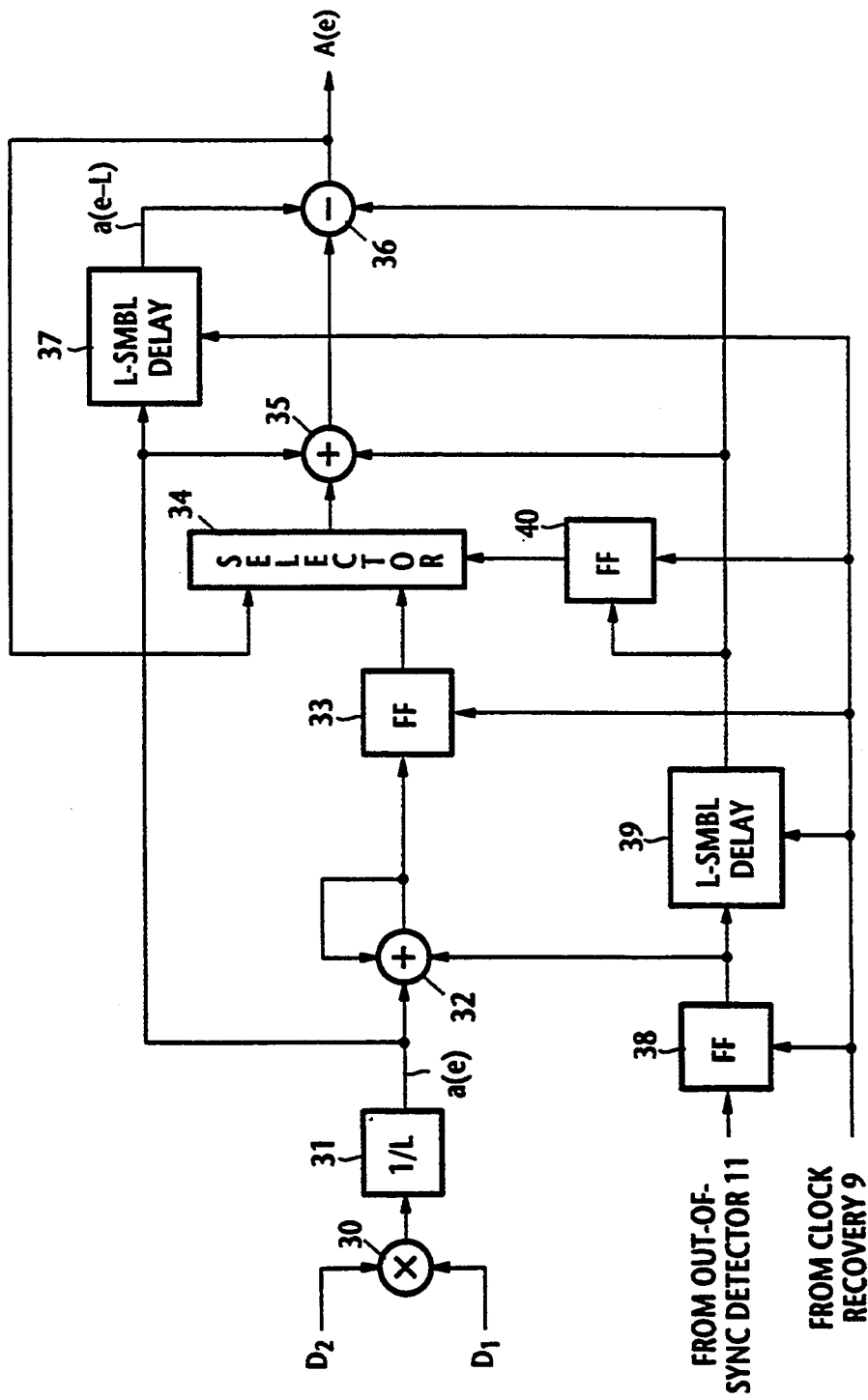
FIG. 2 is a block diagram of each correlation circuit of FIG. 1.

Details of each correlation circuit 27 are shown in FIG. 2. Signals $D_1$ and $D_2$ are supplied to a multiplier 30 to determine their cross correlation. The output of multiplier 30 is divided by a factor 1/L by a divider 31 and fed into a resettable integrator 32. The signal from out-of-sync detector 11 is applied to a flip-flop 38 where it is held until the flip-flop is triggered by clock recovery circuit 9 so that the out-of-sync signal is made to coincide with the timing of the signals $D_1$ and $D_2$. The output of flip-flop 38 is applied as a reset signal to integrator 32. In this way, integrator 32 remains inactive when demodulator 2 is out of phase with the symbol timing and begins its successive summing operations when the demodulator is synchronized.

The output of integrator 32 is applied to a flip-flop 33 where it is delayed for one symbol timing and passed through a selector 34 to a resettable adder 35. A shift register, or L-symbol delay means 39 is provided to introduce delay time (=L×T) to the output of flip-flop 38. The output of shift register 39 is applied to adder 35 as a reset signal so that adder 35 begins its summing operation an (L×T) period after the onset of synchronization to produce a sum of the output of divider 31 with the output of integrator 32.

If the output of divider 31 generated at a count of "e" symbols following the onset of synchronization is represented as $a(e)=(D_1\times D_2)_e/L$, then the integrator output at the input of adder 35 can be represented as $$a'(k) = \sum_{k=e-L}^{e-1} a(k) \quad (1)$$

and the output of adder 35 is given by $a'(k)+a(e)$.

The output of divider 31 is further connected through a shift register 37 to a resettable subtractor 36 to delay the input of the subtractor by L symbols with respect to the input of adder 35 to produce a delayed output b(e) as follows:

$$b(e) = \begin{cases} 0 & (\text{if } 1 \leq e \leq L) \\ a(e-L) & (\text{if } e \geq L+1) \end{cases} \quad (2)$$

The output of adder 35 is coupled to a resettable subtractor 36 to which the signal b(e) from shift register 37 is also applied to produce a tap-weight control signal A(e).

Adder 35 and subtractor 36 are reset in response to the output of shift register 39 so that they start their arithmetic operations (L+1) symbols after the start of operation of the integrator 32. Therefore, the tap-weight control signal A(e) of each correlation circuit is given by:

$$A(e) = \begin{cases} 0 & (\text{if } 1 \leq e \leq L) \\ \sum_{k=e-L}^{e-1} a(k) + a(e) - a(e-L) & (\text{if } e \geq L+1) \end{cases} \quad (3)$$

Equation (3) is rewritten as:

$$A(e) = \sum_{k=e-L+1}^{e} a(k) = \sum_{k=e-L+1}^{e} (D_1 \times D_2)_k/L \quad (4)$$

Equation (4) represents an average value of cross correlations over an L-symbol interval.

During the time interval between the start of operation of the integrator 32 and the arrival of (L+1) symbols, selector 34 establishes a path between the output of flip-flop 33 to adder 35. During a subsequent interval that starts (L+2) symbols after the operation of integrator 32 (i.e., $e \geq L+2$), selector 34 is switched for coupling the output of subtractor 36 to adder 35 to form a feedback loop in response to the output of a flip-flop 40 which introduces one symbol delay to the output of shift register 39. As long as the demodulator is synchronized, the output signal A(e) is fed back to adder 35 and summed with a new value a(e) from the divider 31 and then the old value a(e−L) is removed by subtractor 36. As this process continues, the tap weight control signal is updated at symbol intervals.

The output terminal of each correlation circuit 27 is connected to the tap-weight input of the corresponding tap-weight multiplier where the successively delayed versions of the output of A/D converter 3 are weighted at appropriate timing with respective tap-weight coefficients. In this way, even though the incoming signal fluctuates rapidly due to fading variations, the tap-weight coefficients are updated at a higher rate than the rate of the signal fluctuation. The outputs of multipliers 16–20 are supplied to adder 21 at T/2 intervals where they are summed to produce an output at T/2 intervals. Since useful information occurs at symbol intervals, rather than at T/2 intervals, one sample is produced from latch 6 from each symbol interval and fed into to DFE 7. In a known manner, DFE 7 removes the intersymbol interference which appears as negative peaks of equal amplitudes at times $-T$ and $+T$ since the impulse response of the matched filter is a time-reversed and delayed version of the input signal.

While mention has been made of an embodiment in which divider 31 is located in a position immediately following the correlation detector or multiplier 30, the divider is not limited to that location; it could equally be as well provided to the output of subtractor 36.

What is claimed is:

1. A matched filter receiver in combination with a decision feedback equalizer, comprising:
    a transversal filter having a tapped delay line for receiving an incoming digital signal to produce successively delayed signals at successive taps of the delay line, a plurality of tap-weight multipliers connected respectively to the successive taps of said delay line, and means for summing output signals of said tap-weight multipliers to produce a filter output, and supplying the filter output to said decision feedback equalizer;
    a second tapped delay line having a series of delay elements for receiving said incoming digital signal to produce successively delayed signals at successive taps of the second delay line so that the delayed signal at a center tap of the second delay line is time coincident with an output signal from said decision feedback equalizer;
    a plurality of correlation circuits corresponding respectively to the tap-weight multipliers of said transversal filter and the successive taps of the second delay line, each of the correlation circuits comprising:
    a correlation detector for detecting a correlation between the output signal of said decision feedback equalizer and a signal from the corresponding tap of said second tapped delay line to produce a correlation output signal;
    integrator means for integrating said correlation output signal over a prescribed interval to produce an integrated signal;
    an adder having a first input terminal receiving said correlation output signal, and a second input terminal;
    delay means for delaying said correlation output signal for an interval equal to said prescribed interval to produce a delayed signal;
    a subtractor for detecting a difference between said delayed signal and an output signal of said adder to produce a difference signal and supplying the difference signal to the corresponding tap-weight multiplier; and
    means for initially coupling said integrated signal to the second input terminal of said adder and subsequently coupling said difference signal to said second input of the adder, instead of said integrated signal.

2. A matched filter receiver for a demodulator, comprising:
    a decision feedback equalizer;
    means for generating an out-of-sync signal when the demodulator is not synchronized with an incoming signal;
    a transversal filter having a tapped delay line for receiving a signal from said demodulator to produce successively delayed signals at successive taps of the delay line, a plurality of tap-weight multipliers connected respectively to the successive taps of said delay line, and means for summing output signals of said tap-weight multipliers to produce a filter output, and supplying the filter output to said decision feedback equalizer;
    a second tapped delay line having a series of delay elements connected to receive said incoming digital signal to produce successively delayed signals at successive taps of the second delay line so that the delayed signal at a center tap of the second delay line is time coincident with an output signal from said decision feedback equalizer;
    a plurality of correlation circuits corresponding respectively to the tap-weight multipliers of said transversal filter and the successive taps of the second delay line, each of the correlation circuits comprising:
    a correlation detector for detecting a correlation between the output signal of said decision feedback equalizer and a signal from the corresponding tap of said second tapped delay line to produce a correlation output signal;
    a resettable integrator, when enabled, for integrating said correlation output signal;
    an adder having a first input receiving an output signal from said correlation detector and a second input;
    delay means for delaying the output signal of said correlation detector for a prescribed interval;
    a subtractor for detecting a difference between output signals of said adder and said delay means to produce a difference signal and supplying the difference signal to the corresponding tap-weight multiplier; and
    control means responsive to said out-of-sync signal for resetting said integrator and responsive to absence of said out-of-sync signal for enabling said integrator to integrate said correlation output signal over an interval equal to said prescribed interval to produce an integrated signal, coupling said integrated signal to the second input of said adder, and subsequently coupling said difference signal to said second input of said adder, instead of said integrated signal.

3. A matched filter receiver for a demodulator having means for generating an out-of-sync signal when the demodulator is not synchronized with an incoming signal, comprising:
    a decision feedback equalizer;
    a transversal filter having a tapped delay line for receiving an incoming digital signal to produce successively delayed signals at successive taps of the delay line, a plurality of tap-weight multipliers connected respectively to the successive taps of said delay line, and means for summing output signals of said tap-weight multipliers to produce a filter output, and supplying the filter output to said decision feedback equalizer;
    a second tapped delay line having a series of delay elements connected to receive said incoming digital signal to produce successively delayed signals at successive taps of the second delay line so that the delayed signal at a center tap of the second delay line is time coincident with an output signal from said decision feedback equalizer;

a plurality of correlation circuits corresponding respectively to the tap-weight multipliers of said transversal filter and the successive taps of the second delay line, each of said correlation circuits comprising:
a correlation detector for detecting a correlation between the output signal of said decision feedback equalizer and a signal from the corresponding tap of said second tapped-delay line;
a resettable integrator, when enabled, for integrating a signal from said correlation detector;
one-symbol delay means for delaying an output signal of said integrator for a symbol interval;
a selector having a first input terminal connected to the output of said one-symbol delay means, a second input terminal, and an output terminal for selectively establishing a first connection between said first input terminal and said output terminal, or a second connection between said second input terminal and said output terminal;
a resettable adder, when enabled, for summing output signals from said selector and said correlation detector;

L-symbol delay means for delaying a signal from said correlation detector for an L-symbol interval;
a resettable subtractor, when enabled, for subtracting the output of said L-symbol delay means from the output of said resettable adder to produce a difference signal and supplying the difference signal to the second input of said selector and to the corresponding tap-weight multiplier;
first resetting means responsive to said out-of-sync signal for resetting said integrator and responsive to absence of said out-of-sync signal for enabling said integrator;
second resetting means for resetting said resettable adder and subtractor an L-symbol interval after said integrator is reset by said first resetting means and enabling said resettable adder and resettable subtractor an L-symbol interval after said integrator is enabled; and
control means for initially causing said selector to establish said first connection and subsequently causing said selector to establish said second connection an $(L+1)$-symbol interval after said integrator is enabled by said first resetting means.

* * * * *